United States Patent [19]
Gusakov

[11] Patent Number: 5,109,165
[45] Date of Patent: Apr. 28, 1992

[54] FAILSAFE FEEDBACK CONTROL SYSTEM

[75] Inventor: Ignaty Gusakov, East Aurora, N.Y.

[73] Assignee: Gaymar Industries, Inc., Orchard Park, N.Y.

[21] Appl. No.: 625,450

[22] Filed: Dec. 11, 1990

[51] Int. Cl.$^5$ .......................... H03K 3/26; H03K 5/153
[52] U.S. Cl. ................................... 307/359; 307/310; 307/354; 307/362
[58] Field of Search ............... 307/354, 362, 310, 359

[56] References Cited

U.S. PATENT DOCUMENTS

| | | | |
|---|---|---|---|
| 3,667,476 | 6/1972 | Muller | 128/399 |
| 3,789,853 | 2/1974 | Reinhard | 128/399 |
| 4,034,740 | 7/1977 | Atherton et al. | 128/1 B |
| 4,127,088 | 11/1978 | Ezoe | 123/32 EE |
| 4,317,018 | 2/1982 | Denny et al. | 219/216 |
| 4,397,314 | 8/1983 | Vaguine | 128/399 |
| 4,531,495 | 7/1985 | Yamoto et al. | 123/479 |
| 4,677,282 | 6/1987 | Walsh | 219/508 |
| 4,704,685 | 11/1987 | Martinsons et al. | 364/431.11 |
| 4,750,474 | 6/1988 | Dukhan et al. | 128/1 B |
| 4,780,826 | 10/1988 | Nakano et al. | 364/431.03 |
| 4,969,459 | 11/1990 | Gusakov | 128/399 |

*Primary Examiner*—Timothy P. Callahan
*Attorney, Agent, or Firm*—Young & Thompson

[57] ABSTRACT

A failsafe feedback control system of the type including transducers for measuring a characteristic of some object and emitting a signal representative of such measurement to a controlled apparatus the operation of which is responsive to such signal. The apparatus includes a first switch for detecting when any two transducers have failed and a second switch for detecting when any one transducer has failed. The responsiveness of the circuitry of each transducer can be set independent of that of all of the other transducers.

20 Claims, 4 Drawing Sheets

FAILSAFE FEEDBACK CONTROL SYSTEM

BACKGROUND OF THE INVENTION

1. Field of the Invention

The present invention relates to a feedback control system which provides failsafe operation of a controlled apparatus in the event of failure of one or more feedback transducers electrically connected to the controlled apparatus through a failsafe feedback control system.

2. Description of the Prior Art

The need for failsafe operation of an apparatus the control of which is responsive to feedback transducers is well known. Of particular concern are those instances when one or more feedback transducers fail. For example, patients are typically heated using a closed loop infrared heating system wherein heat lamps are positioned above the chest and face. One or more temperature transducers in the form of thermistors, resistance thermometers or thermocouples is installed on the skin of the patient in the area being heated. Such transducers are intended to measure skin temperature and to send signals representative of such measurement to the apparatus which controls the heat lamps to assure that the patient is not burned and temperature is controlled t desired levels during treatment. Such transducers are prone to failure in that they can be dislodged from the skin. In such instances, the dislodged transducer will no longer report the actual skin temperature being controlled. In addition to being dislodged from the skin, such transducers can fail in an open or short circuit mode with similar results. Regardless of the reason for transistor failure, the result will be that the controlled lamp apparatus will function in an unsafe manner since the skin temperature will not be maintained at the desired level.

It is an object of the present invention to provide a failsafe feedback control system wherein failure of one or more measuring transducers is compensated for in the operation of a controlled apparatus.

It is another object of the present invention to provide a failsafe feedback control system wherein dislodgement of a transducer from an object having a characteristic being measured is compensated for in the operation of a controlled apparatus performing a function upon such object.

It is a further object of the present invention to provide a failsafe feedback control system wherein if one or more transducers fail in an open or short circuit mode, the operation of the controlled apparatus performing a function upon the object being measured by such transducers will be automatically adjusted to compensate for such transducer failure.

It is a further object of the present invention to provide a failsafe feedback control system which includes two or more transducers the failure of one or more of which is compensated for.

SUMMARY OF THE INVENTION

In order to achieve failsafe operation of a controlled apparatus at least two feedback sensors are provided. Although three feedback sensors are discussed herein, it will be evident that more feedback sensors could be used to further enhance the reliability of the system. In addition, although the discussion herein is with respect to an infrared, closed loop heating system, the present invention can be used in any other control system wherein operation of a controlled apparatus performing a function upon an object having a characteristic being measured by two or more transducers, the degree of such measurement controlling the controlled apparatus, will be automatically adjusted to compensate for the failure of one or more of such transducers. This invention achieves these and other results by providing a failsafe feedback control system of the type including means for measuring a characteristic and emitting a signal representative of such measurement to a controlled apparatus the operation of which is responsive to such signal. The control system comprises means for measuring a characteristic and to generate first signals representative of such measurement. First amplifier means is provided electrically connected to the measuring means to receive the first signals from the measuring means for scaling and filtering the first signals and to generate second signals. Second amplifier means is provided for establishing gain and boundary limits for positive and negative swings of amplifier voltages of the second amplifier means. The second amplifier means is electrically connected to the first amplifier means to receive the second signals and to generate third signals. Threshold detector means is electrically connected to the second amplifier means to receive the third signals for the determination of whether preset levels of positive and negative voltage from the second amplifier means have been reached and to generate fourth signals representative of such determination. Means is electrically connected to the threshold detector means for detecting the presence of fourth signals generated by the threshold detector means which signify failure of a measuring means by exceeding an allowable limit and to generate fifth signals representative of such failure. Switch means is electrically connected to the detecting means to receive the fifth signals for detecting whether any measuring means have failed. Summing resistor means is electrically connected between the second amplifier means and the threshold detector means for summing input resistance of each circuit carrying a first signal and generating sixth signals. Averaging amplifier means is provided having an input electrically connected to the summing resistor means for receiving the sixth resistance signals from the summing resistor means and calculating gain of the averaging amplifier means as the negative of the ratio of feedback resistance of the averaging amplifier means to input resistance, and generating a respective seventh signal at an output electrically connectable to the controlled apparatus.

BRIEF DESCRIPTION OF THE DRAWINGS

This invention may be clearly understood by reference to the attached drawings in which.

DESCRIPTION OF THE PREFERRED EMBODIMENT

Figure 1:
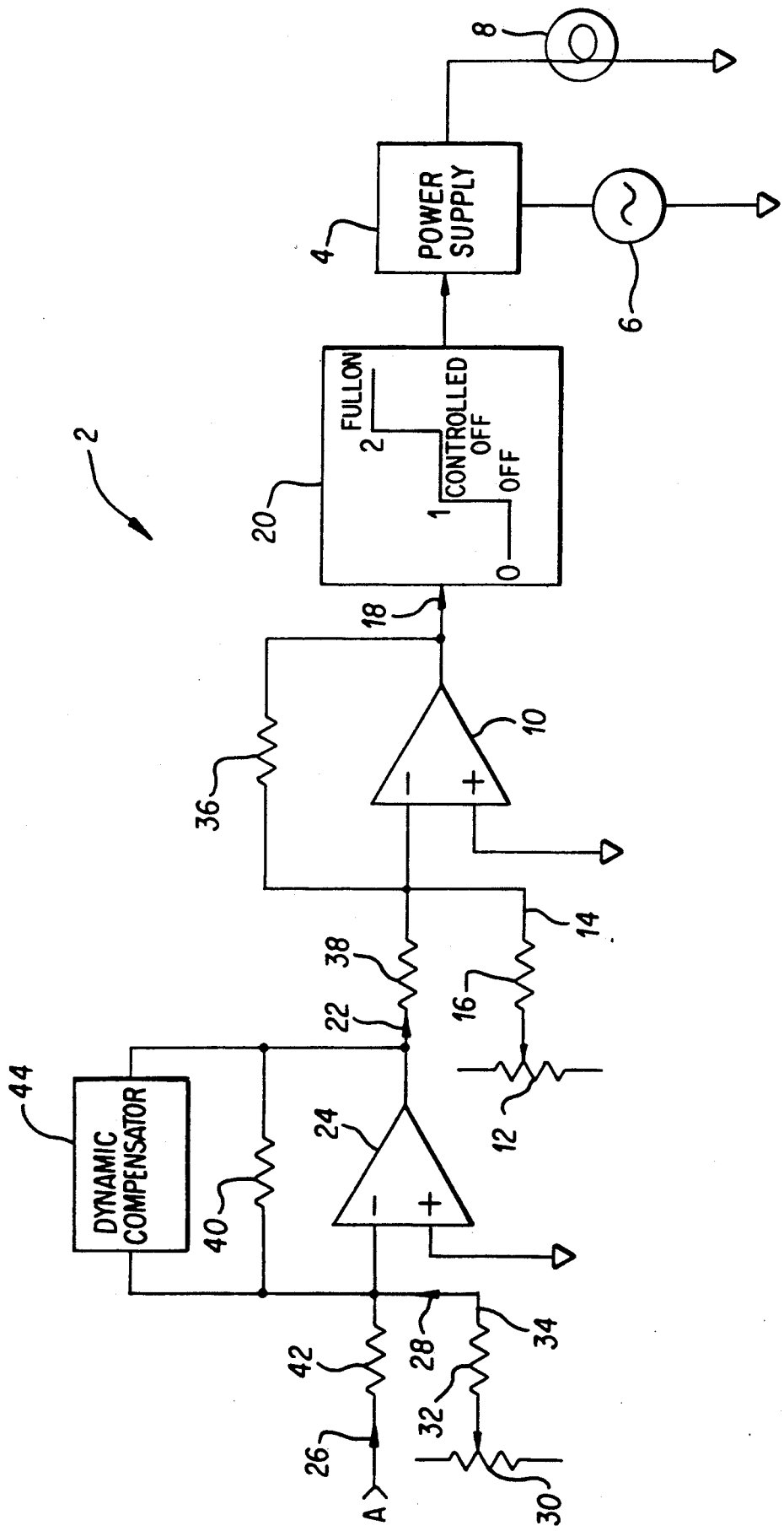
FIG. 1 depicts a block diagram of an apparatus to be controlled by the failsafe feedback control system of the present invention.

The embodiment of this invention which is illustrated in the drawings is particularly suited for achieving the objects of this invention. Generally, the present invention relates to a failsafe feedback control system of the type depicted in FIG. 2 which includes means for measuring some characteristic and emitting a signal representative of such measurement to a controlled apparatus such as is depicted by way of example in FIG. 1, the operation of such controlled apparatus being responsive to such signal.

Figure 2A:
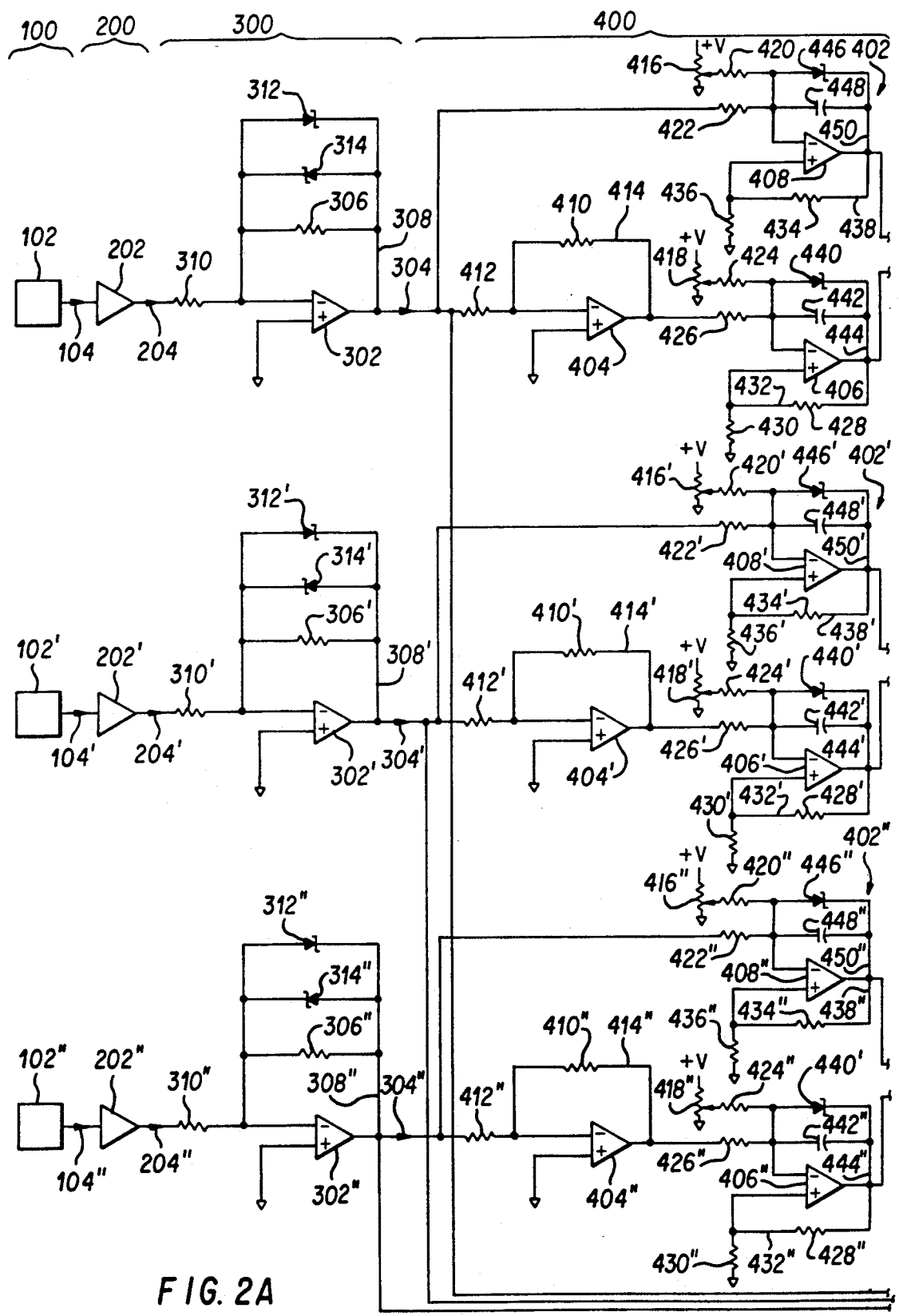
FIG. 2 depicts a schematic of the preferred embodiment of the failsafe feedback control system of the present invention including FIGS. 2A, 2B and 2C.
Figure 2B:
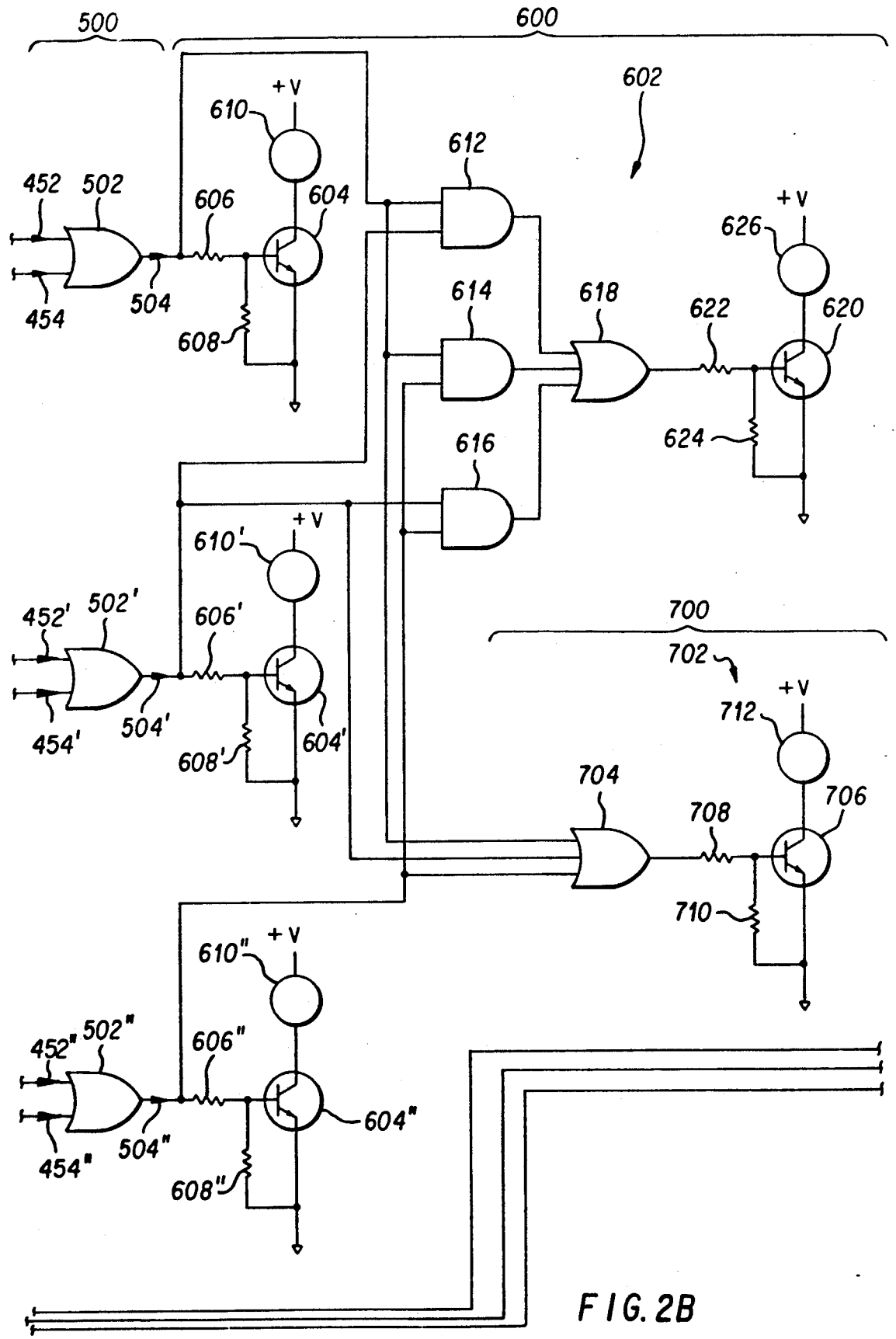
Figure 2C:
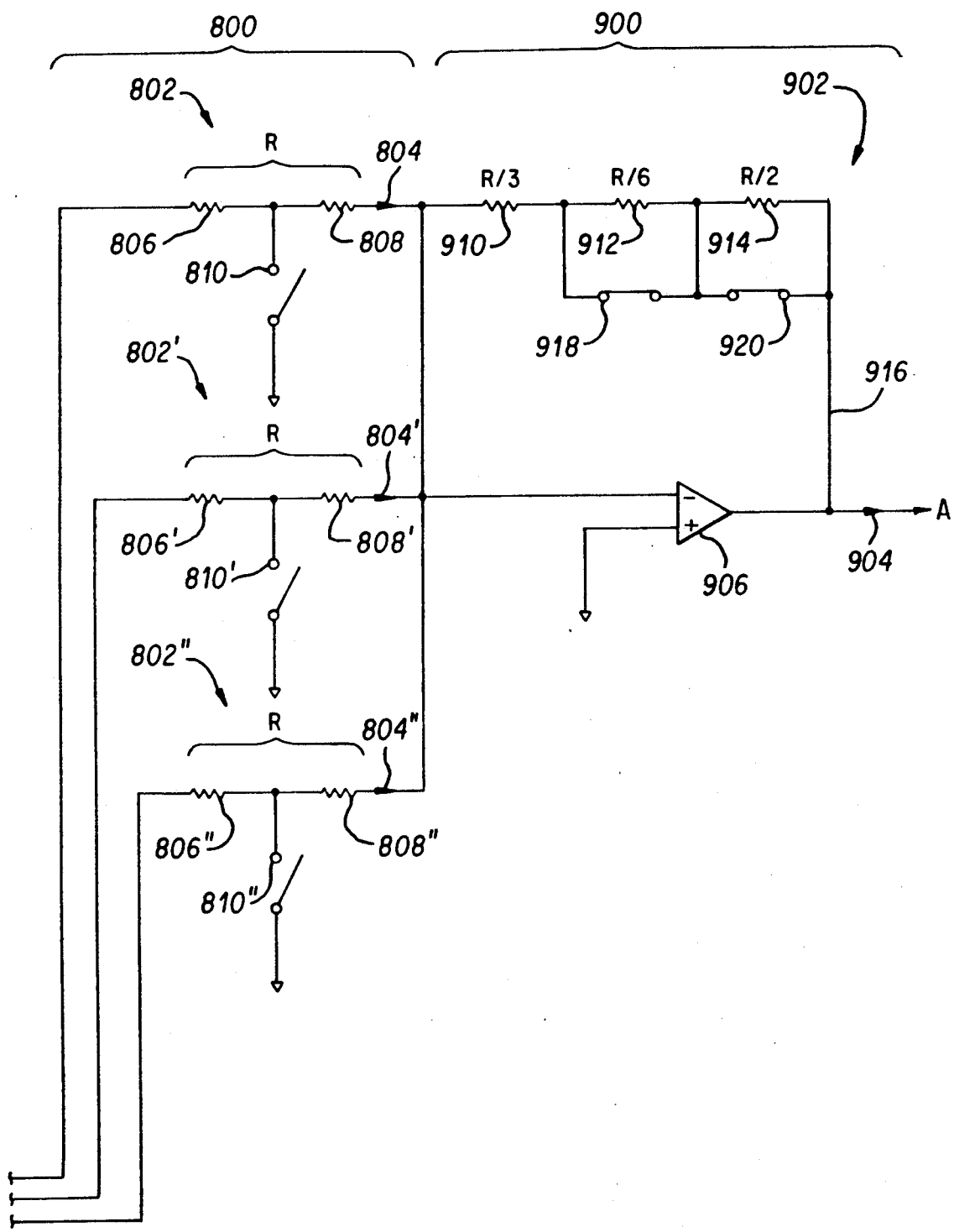

The controlled apparatus can be any apparatus the operation of which is responsive to signals received from the failsafe feedback control system of FIG. 2. In the discussion herein, an infrared heating controlled apparatus of the type depicted in FIG. 1 is discussed, but such discussion is by way of example only. The infrared heating controlled apparatus 2 of FIG. 1 is depicted in block diagram form to illustrate its major components and electrical interconnections. The controlled apparatus 2 is similar to the type described in U.S. Pat. No. 4,969,459 naming Ignaty Gusakov as patentee and Gaymar Industries, Inc. as assignee. Controlled apparatus 2 is in the form of an output control network which includes a power supply 4 electrically connected to a standard source 6 of alternating current in a known manner for powering a plurality of infrared heat lamps 8 (only one is shown) which are disposed in such a manner as to irradiate a patient under treatment. A control amplifier 10 is provided with a potentiometer 12 for adjustment and is electrically connected by conductor 14 through resistor 16 to an inverting input of the control amplifier 10. The control amplifier 10 generates a signal 18 which activates a three-level power control 20 associated with the power supply 4. The "CONTROLLED OFF" level is set by the potentiometer 12 in a known manner. A control signal 22 is generated by a summing amplifier 24 and is electrically connected to an inverting input of control amplifier 10 through resistor 38. Summing amplifier 24 compares a feedback signal 26 received at A in FIG. 1 from the failsafe feedback control system of FIG. 2, as described herein, to a set point signal 28 derived from the potentiometer 30 which performs a bias adjustment structure. Potentiometer 30 is electrically connected to an inverting input of summing amplifier 24 through resistor 32 by conductor 34. The ratio of resistor 36 to resistor 38 establishes the gain of control amplifier 10 which is typically −1. The dc gain of summing amplifier 24 is established by the ratio of resistor 40 to resistor 42 and typically is very high in order to achieve accurate and tight control of the output temperature of lamps 8. A dynamic compensator 44 is disposed parallel to resistor 40 in the negative feedback line of summing amplifier 24 to stabilize the output controlled network 2 at frequencies which would result in system oscillation or hunting.

FIG. 2 of the present invention depicts a failsafe feedback control system which is useful in controlling the operation of a controlled apparatus such as, for example, the infrared heating controlled apparatus 2 of FIG. 1. However, it will be apparent to those skilled in the art that the failsafe feedback control apparatus of the present invention is useful in controlling various other known controlled apparatus by measuring various characteristics of an object and emitting signals which are representative of such measurement to the controlled apparatus the operation of which is responsive to such signals. In particular, the failsafe feedback control apparatus of the present invention is useful with any controlled apparatus which functions with objects having measurable characteristics such as, without limitation, pressure, flow, force, acceleration, velocity and position.

Referring to FIG. 2, the failsafe feedback control system of the present invention includes measuring means 100, first amplifier means 200, second amplifier means 300, threshold detector means 400, detecting means 500, switch means including first switch means 600 and second switch means 700, summing resistor means 800 and averaging amplifier means 900.

In the present invention means is provided for measuring a characteristic and to generate first signals representative of such measurement. In the embodiment of FIG. 2, two or more measuring means are provided for measuring a characteristic and to generate first signals 104, 104′, 104″ which are representative of such measurement. For example, in considering one use of the infrared heating controlled apparatus of FIG. 1, infrared heat lamps 8 are positioned above the chest and face of a patient. In such use, it is desirable to control the skin temperature of the patient to prevent burning. To this end, the failsafe feedback control system of FIG. 2 provides two or more measuring means for measuring that portion of the patient's skin being subjected to the infrared heat lamps 8 in order to generate first signals representative of such measurement; that is, representative of the temperature being measured by the particular measuring means. In the example depicted in FIG. 2, each measuring means is in the form of transducers 102, 102′ and 102″. Transducers 102, 102′, 102″ are preferably attached to various locations of a patient being treated so as to generate respective signals 104, 104′, 104″ corresponding to the skin temperature of the patient at such locations. Such temperature measuring transducers can be, without limitation, thermistors, resistance thermometers, or the like.

The failsafe feedback control system of the present invention also includes first amplifier means electrically connected to the measuring means to receive first signals from such measuring means for scaling and filtering such first signals in order to generate second signals representative of such scaling and filtering. In the embodiment of FIG. 2, the first amplifier means includes a plurality of signal conditioning amplifiers in the form of first amplifiers 202, 202′, 202″ each having an input electrically connected to an output of a respective transducer 102, 102′, 102″. First amplifiers filter the raw transducer signals 104, 104′ 104″ and generate respective scaled and filtered second signals 204, 204′, 204″.

The failsafe feedback control system of the present invention also includes second amplifier means for establishing gain and boundary limits for positive and negative swings of amplifier voltages of the second amplifier means. The second amplifier means is electrically connected to the first amplifier means to receive second signals in order to generate third signals. In the embodiment of FIG. 2, the second amplifier means includes a plurality of second amplifiers 302, 302′, 302″ each having an inverting input electrically connected to an output of a respective first amplifier 202, 202′, 202″. The gain and boundary limits are established as discussed below such that respective third signals 304, 304′, 304″ are generated. In the preferred embodiment, gain is established by providing first resistors 306, 306′ 306″ electrically connected in a negative feedback line 308, 308′, 308″ of a respective second amplifier 302, 302′, 302″ and a second resistor 310, 310′, 310″ having an input side electrically connected to an output of a respective first amplifier 202, 202′, 202″, and an output side electrically connected to an inverting input of a respective second amplifier. Gains are established by the ratios of resistors 306, 306', 306" to respective resistors 310, 310', 310". In the preferred embodiment, boundary limits of each second amplifier 302, 302', 302" are established by providing respective first zener diodes 312, 312', 312" and respective reversed second zener diodes 314, 314', 314" which are electrically connected across respective first resistors 306, 306', 306", and to each other, in opposed parallel fashion. In essence, voltage excursion limits ar established by the zener diodes 312, 314; 312', 314'; 312", 314" in respective feedback lines 308, 308', 308" of respective second amplifiers 302, 302', 302". By establishing such signal limiters it is possible to prevent runaway signals from one or more transducer(s) from saturating circuit components during failure of such transducer(s). In other words, if one transducer should fail, the signal generated by such transducer will only reach the limit value established and then stop. If desired, such voltage excursion limits can be made different for positive versus negative voltage swings by the appropriate selection of voltage ratings for respective zener diodes.

The failsafe feedback control system of the present invention also includes threshold detector means electrically connected to the second amplifier means to receive third signals for the determination of whether preset levels of positive and negative voltage from the second amplifier means have been reached and to generate fourth signals representative of said determination. In the preferred embodiment, threshold detector means 402, 402', 402" are provided each of which includes an inverter 404, 404', 404" having an inverting input electrically connected to an output of a respective second amplifier 302, 302', 302". A third amplifier 406, 406', 406" is also provided having an inverting input electrically connected to an output of a respective inverter 404, 404', 404" and an output electrically connected to an input of a respective detecting means 502, 502', 502". A fourth amplifier 408, 408', 408" is also provided having an inverting input electrically connected to the output of a respective second amplifier 302, 302' 302" and an output electrically connected to an input of are respective detecting means 502, 502', 502". Amplifiers 408, 408', 408" detect negative going voltages and amplifiers 406, 406', 406" detect positive going voltages. Inverters 404, 404', 404" provide the negative polarity signal required by amplifiers 406, 406', 406". The gain of each inverter 404, 404', 404" is established by the ratio of third resistors 410, 410', 410" to fourth resistors 412, 412', 412", respectively and is typically $-1$. Each third resistor 410, 410', 410" is electrically connected in a respective negative feedback line 414, 414', 414". Each fourth resistor 412, 412', 412" includes an input side electrically connected to an output of a respective second amplifier 302, 302', 302" and an output electrically connected to the inverting input of a respective inverter 404, 404', 404".

In the preferred embodiment, each threshold detector means 402, 402', 402" also includes a plurality of pairs of potentiometers 416, 418; 416', 418'; 416", 418" each of which is electrically connected to a positive dc voltage for reference. A plurality of summing resistors is also provided including first through fourth summing resistors. Each first summing resistor 420, 420', 420" has an output side electrically connected to an inverting side of a respective fourth amplifier 408, 408', 408" and an input side electrically connected to a respective first potentiometer 416, 416', 416" of a respective pair of potentiometers. Each second summing resistor 422, 422', 422" has an input side electrically connected to an output of a respective second amplifier 302, 302', 302" and an output side electrically connected to an inverting input of a respective fourth amplifier 408, 408', 408". Each third summing resistor 424, 424', 424" has an output side electrically connected to an inverting input of a respective third amplifier 406, 406', 406" and an input side electrically connected to a respective second potentiometer 418, 418', 418" of a respective pair of potentiometers. Each fourth summing resistor 426, 426', 426" has an input side electrically connected to an output of a respective inverter 404, 404', 404" and an output side electrically connected to an inverting input of a respective third amplifier 406, 406' 406".

Each third amplifier 406, 406', 406" includes a pair of fifth resistors 428, 430; 428', 430'; 428", 430". Each resistor 428, 428', 428" is electrically connected in a positive feedback line 432, 432' 432" of a respective third amplifier 406, 406', 406" and each resistor 430, 430', 430" has one side electrically connected to the noninverting input of a respective third amplifier 406, 406', 406" and another side electrically connected to ground. Each fourth amplifier 408, 408', 408" includes a pair of fifth resistors 434, 436; 434', 436'; 434", 436". Each resistor 434, 434', 434" is electrically connected in a positive feedback line 438, 438', 438" of a respective fourth amplifier 408, 408', 408" and each resistor 436, 436', 436" has one side electrically connected to the noninverting input of a respective fourth amplifier 408, 408', 408" and another side electrically connected to ground.

Each third amplifier 406, 406', 406" also includes a third zener diode 440, 440', 440" and a first capacitor 442, 442', 442" each of which is electrically connected to each other in parallel in a negative feedback line of said third amplifier 406, 406', 406". Similarly, each fourth amplifier 408, 408', 408" includes a fourth zener diode 446, 446', 446" and a second capacitor 448, 448', 448" each of which is electrically connected to each other in parallel in a negative feedback line of said fourth amplifier 408, 408', 408".

In considering the threshold detector means located at 500, respective detector levels are established by potentiometers 416, 418; 416', 418'; 416", 418" each of which is connected to a positive dc voltage for reference. Such detector levels are set just below or lower than the level of the limit levels of respective second amplifiers 302, 302', 302". The filter capacitors 442, 448; 442' 448'; 442", 448" are provided to reduce turn-on or turn-off events that would cause high frequency noise or chatter. Threshold is provided to prevent nuisance tripping and is established by the positive feedback networks comprising respective resistor pairs 428, 430; 428', 430'; and 428", 430" and resistor pairs 434, 436; 434', 436'; and 434", 436". Pairs of summing resistors 420, 422; 420', 422'; 420", 422" establish the threshold for respective third negative signals 304, 304', 304", and pairs of summing resistors 424, 426; 424', 426'; and 424", 426" establish the threshold for respective third positive signals 304, 304', 304". Zener diodes 440, 440', 440" limit the output voltage of respective amplifiers 406, 406', 406" and zener diodes 446, 446', 446" limit the output voltage of respective amplifiers 408, 408', 408". In particular, the output voltage of each amplifier is limited to a value compatible with the detecting means, which is typically 5 volts, to insure a positive off signal of $-0.7$ volts when the amplifiers are off. In the present invention detecting means is electrically connected to the threshold detector means for detecting the presence of fourth signals generated by said threshold detector means which signify failure of a measuring means by exceeding an allowable limit, and to generate fifth signals representing such failure. In the embodiment of FIG. 2, a plurality of detecting means are provided, each electrically connected to a respective threshold detector means for detecting the presence of any fourth signals generated by a respective threshold detector means which signify failure of a measuring means by exceeding an allowable limit, and to generate fifth signals representative of such failure. In the preferred embodiment of FIG. 2 each detecting means is in the form of first, second and third OR gates 502, 502', 502" each of which has an output value of 5 volts. OR gates 502, 502', 502" detect the presence of signals 452, 454; 452', 454'; 452", 454" from respective threshold detector means 402, 402', 402" signifying that a respective transducer signal 104, 104', 104" has exceeded the allowable limits and is considered to have failed. For example, if the output of a particular OR gate goes high it means that either a positive or negative voltage limit has been reached for the signal associated with a respective transducer. The output signals 504, 504', 504" of respective OR gates 502, 502', 502" connect to first switch means located at 600.

In the present invention, switch means are electrically connected to the detecting means to receive the fifth signals for detecting whether any measuring means has failed. In the preferred embodiment of FIG. 2 such switch means includes first and second switch means located at 600 and 700, respectively. The first switch means is electrically connected to detecting means to receive fifth signals for detecting whether any two measuring means have failed. In the embodiment of FIG. 2, a first switch means 602 is electrically connected to detecting means 502, 502', 502" to receive fifth signals 504, 504', 504" for detecting whether any two measuring means 102, 102', 102" have failed. First switch means 602 includes a plurality of transistor switches 604, 604', 604" the base of each of which is electrically connected to a respective OR gate 502, 502', 502" through a respective fifth resistor 606, 606', 606", the emitter of each of which is electrically connected to a respective base, through a respective sixth resistor 608, 608', 608", and to ground, and the collector of which is electrically connected to a respective first relay 610, 610', 610" which has normally open contacts and is electrically connected to a positive dc voltage. First switch means 602 also includes a first AND gate 612, a second AND gate 614, a third AND gate 616, and a fourth OR gate 618. The first AND gate 612 and second AND gate 614 each have a first input electrically connected to each other and to an output of first OR gate 502. The second AND gate 614 and third AND gate 616 each have a second input electrically connected to each other and to an output of the third OR gate 502". And the first AND gate 612 includes a second input electrically connected to a first input of the third AND gate 616 and to an output of the second OR gate 502'. A transistor switch 620 is provided, the base of which is electrically connected to an output of the fourth OR gate 618 through a seventh resistor 622, the emitter of which is electrically connected to the base through an eighth resistor 624, and to ground, and the collector of which is electrically connected to a second relay 626 which has normally open contacts and is electrically connected to a positive dc voltage.

In the operation of the first switch means 602 the output signals 504, 504', 504" connect to respective transistor switches 604, 604', 604" through resistors 606, 606', 606". Resistors 608, 608', 608" prevent the bases of respective transistor switches 604, 604', 604" from floating in the off condition. The transistor switches turn on respective relays 610, 610', 610". Relays 610, 610', 610" have normally open contacts which close when pulled in. Such contacts are used to ground the signals from the corresponding transducer 102, 102', 102" thereby preventing such signals from reaching averaging amplifier 906 described below. Output signals 504, 504', 504" are used to determine whether any two transducers 102, 102', 102" have failed. In particular, AND gate 612 goes high if transducers 102 and 102' fail; AND gate 614 goes high if transducers 102 and 102" fail; and AND gate 616 goes high if transducers 102' and 102" fail. OR gate 618 goes high if any two transducers 102, 102', 102" fail since the outputs of AND gates 612, 614 and 616 are electrically connected to the input of OR gate 618. Relay 626 is pulled in when transistor switch 620 is turned on by OR gate 618.

In the present invention, the second switch means is electrically connected to detecting means to receive the fifth signals for detecting whether any one measuring means has failed. In the embodiment of FIG. 2, a second switch means 702 is electrically connected to detecting means 502, 502', 502" to receive fifth signals 504, 504', 504" for detecting whether any one measuring means 102, 102', 102" has failed. Second switch means 702 includes a fifth OR gate 704 having a first input electrically connected to an output of first OR gate 502, a second input electrically connected to an output of the second OR gate 502', and a third input electrically connected to an output of the third OR gate 502". A transistor switch 706 is provided, the base of which is electrically connected to an output of the fifth OR gate 704 through a ninth resistor 708, the emitter of which is electrically connected to the base of transistor switch 706, through a tenth resistor 710, and to ground, and the collector of which is electrically connected to a third relay 712 which has normally open contacts and is electrically connected to a positive dc voltage. OR gate 704 functions in the same manner as OR gate 618 with the exception that OR gate 704 only detects whether any one transducer 102, 102', 102" has failed. OR gate 704 functions in this manner since its input is electrically connected to the outputs of each OR gate 502, 502' 502". Relay 712 pulls in as transistor switch 706 turns on when the output of OR gate 704 goes high.

In the present invention, summing resistor means are provided electrically connected between the second amplifier means and the threshold detector means for summing input resistance of each circuit carrying a first signal and generating a sixth signal. In the embodiment of FIG. 2, a plurality of summing resistor means 802, 802', 802" are provided electrically connected between respective second amplifier means 302, 302', 302" and respective threshold detector means 402, 402', 402" for summing input resistance of each circuit carrying a first signal 104, 104', 104" and generating a sixth signal 804, 804', 804". In the preferred embodiment, each summing resistor means 802, 802', 802" includes a plurality of pairs of summing resistors, each pair including a fifth summing resistor 806, 806', 806" and a sixth summing resistor 808, 808', 808". Each resistor 806, 806', 806" has an input side electrically connected to a respective second amplifier 302, 302', 302". Each resistor 808, 808', 808" has an input side electrically connected to an output side of a respective summing resistor 806, 806', 806" and an output side electrically connected to an averaging amplifier means located at 900. A fourth relay contact 810, 810', 810" has a normally open contact electrically connected between respective resistors 806, 806', 806" and 808, 808', 808" and ground. The combined value of each series pair 806, 808; 806', 808'; 806", 808" of summing resistors has a value of R.

In the present invention, averaging amplifier means is provided having an input electrically connected to the summing resistor means for receiving the sixth signal and calculating gain of the averaging amplifier means as the negative of the ratio of feedback resistance of the averaging amplifier means to input resistance, and generating a respective seventh signal at an output electrically connectable to the controlled apparatus. In the embodiment of FIG. 2, averaging amplifier means 902 is provided having an input electrically connected to summing resistor means 802, 802', 802" for receiving sixth signals 804, 804', 804" and calculating gain of the averaging amplifier means 902 as the negative of the ratio of feedback resistance of the averaging amplifier means to input resistance, and generating a respective seventh signal 904 at an output electrically connectable to the controlled apparatus of FIG. 1 at point A. In the preferred embodiment, the averaging amplifier means includes an averaging amplifier 906 having an inverting input electrically connected to an output of each resistor 808, 808', 808" and an output electrically connectable to the apparatus of FIG. 1 at A. Seventh resistor 910, eighth resistor 912 and ninth resistor 914 are electrically connected in series in a feedback line 916. A fifth relay 918 has a normally closed contact electrically connected across resistor 912. A sixth relay 920 has a normally closed contact electrically connected across resistor 914. The values of resistors 910, 912 and 914 are R/3, R/6 and R/2, respectively.

In operation, the averaging amplifier 906 receives signals 304, 304', 304" from second amplifier 302, 302', 302" through pairs of summing resistors 806, 808; 806', 808'; 806", 808", respectively. Each series combination of resistors 806 and 808; 806' and 808'; and 806" and 808" has a value of R. Respective grounding relay contacts 810, 810', 810" are disposed between ground and a respective junction between respective resistors of each pair; that is, between resistors 806 and 808; between resistors 806' and 808', and between resistors 806" and 808". In this manner, when a contact of a relay 810, 810', 810" closes, there will be sufficient impedance between ground and the output of second amplifiers 302, 302', 302" so that the voltage present at the output of second amplifiers 302, 302', 302" will not be disturbed. The feedback resistor on the averaging amplifier 906 is comprised of resistors 910, 912, 914 in series having values of R/3, R/6 and R/2, respectively. The gain of amplifier 906 is determined by the negative of the ratio of the feedback resistance to the input resistance of each respective circuit carrying a transducer signal. If all three transducers are operating within their limits, the gain of amplifier 906 will be $-\frac{1}{3}$ and all three inputs 804, 804', 804" are summed. Resistor 910 determines the gain which becomes $-R/3/R$ or $-\frac{1}{3}$ for each of the three inputs. Relay contacts 918 and 920 will be shorted and have zero resistance when all three transducers 102, 102', 102" operate within their limits. If one transducer fails, and two operate within their limit, relay 918 pulls in, the contact at relay 918 opens, and the feedback resistance of amplifier 906 becomes $-(R/3+R/6)=-R/2$, and the gain of amplifier 906 becomes $-R/2/R$ or $-\frac{1}{2}$ for each of the two functioning transducers. If two transducers fail, relay 920 pulls in and the contact at relay 920 opens, and the feedback resistance of amplifier 906 becomes $R/3+R/6+R/2=R$, and the gain becomes $-R/R$ or $-1$ for the one remaining functioning transducer. In each instance, a corresponding signal 904 is emitted by amplifier 906, such signal 904 connecting with the input of the control shown in FIG. 1 at A.

The embodiment which has been described herein is but one of several which utilize this invention and is set forth here by way of illustration but not of limitation. It is apparent that many other embodiments which will be readily apparent to those skilled in the art may be made without departing materially from the spirit and scope of this invention.

I claim:

1. A failsafe feedback control system of the type including means for measuring a characteristic and emitting a signal representative of said measurement to a controlled apparatus the operation of which is responsive to said signal, comprising:

means for measuring a characteristic and to generate first signals representative of said measurement;

first amplifier means electrically connected to said measuring means to receive said first signals from said measuring means for scaling and filtering said first signals and to generate second signals;

second amplifier means for establishing gain and boundary limits for positive and negative swings of amplifier voltages of said second amplifier means, said second amplifier means being electrically connected to said first amplifier means to receive said second signals and to generate third signals;

threshold detector means electrically connected to said second amplifier means to receive said third signals for the determination of whether preset levels of positive and negative voltage from said second amplifier means have been reached and to generate fourth signals representative of said determination;

means electrically connected to said threshold detector means for detecting the presence of fourth signals generated by said threshold detector means which signify failure of said measuring means by exceeding an allowable limit, and to generate fifth signals representative of said failure;

summing resistor means electrically connected between said second amplifier means and said threshold detector means for summing third signals of each circuit and generating a sixth signals;

averaging amplifier means having an input electrically connected to said summing resistor means for receiving said sixth signals from said summing resistor means, and establishing gain of said averaging amplifier means, the gain of said averaging amplifier means being the negative of a ratio of feedback resistance to input resistance of said averaging amplifier means, and generating a respective seventh signal at an output electrically connectable to said controlled apparatus; and switch means electrically connected to said detecting means to receive said fifth signals for controlling said summing resistor means and said averaging amplifier means in response to any failure of said measuring means.

2. A failsafe feedback control system of the type including means for measuring a characteristic and emitting a signal representative of said measurement to a controlled apparatus the operation of which is responsive to said signals, comprising:
- two or more means for measuring a characteristic and to generate first signals representative of said measurement;
- two or more first amplifier means each electrically connected to a respective measuring means to receive said first signals from said respective measuring means for scaling and filtering said first signals and to generate second signals;
- two or more second amplifier means for establishing gain and boundary limits for positive and negative swings of amplifier voltages of said second amplifier means, each second amplifier means being electrically connected to a respective first amplifier means to receive said second signals and to generate third signals;
- two or more threshold detector means each electrically connected to a respective second amplifier means to receive said third signals for the determination of whether preset levels of positive and negative voltage from said respective second amplifier means have been reached and to generate fourth signals representative of said determination;
- two or more means each electrically connected to a respective threshold detector means for detecting the presence of any fourth signals generated by said respective threshold detector means which signify failure of a measuring means by exceeding an allowable limit and to generate fifth signals representative of said failure;
- two or more summing resistor means each electrically connected between a respective second amplifier means and a respective threshold detector means for summing third signals of each circuit and generating a respective sixth signal;
- averaging amplifier means having an input electrically connected to each of said two or more summing resistor means for receiving said sixth signals from said two or more summing resistor means, and establishing gain of said averaging amplifier means, the gain of said averaging amplifier means being the negative of a ratio of feedback resistance to input resistance of said averaging amplifier means, and generating a respective seventh signal at an output electrically connectable to said controlled apparatus;
- first switch means electrically connected to each of said two or more means to receive said fifth signals for controlling said two or more summing resistor means and said averaging amplifier means in response to failure of any two measuring means; and
- second switch means electrically connected to each of said two or more means to receive said fifth signals for controlling said two or more summing resistor means and said averaging amplifier means in response to failure of any one measuring means.

3. The control system of claim 2 wherein each measuring means is a transducer.

4. The control system of claim 3 wherein each first amplifier means includes a first amplifier having an input electrically connected to an output of a respective transducer.

5. The control system of claim 4 wherein each second amplifier means includes a second amplifier having an input electronically connected to an output of a respective first amplifier.

6. The control system of claim 5 wherein each second amplifier includes a first resistor electrically connected in a feedback line of said second amplifier and a second resistor having an input side electrically connected to an output of a respective first amplifier, and an output side electrically connected to an input of said second amplifier, for establishing said gain of said second amplifier.

7. The control system of claim 6 wherein each second amplifier includes a first zener diode and a second zener diode which are electrically connected to said first resistor and to each other in opposing parallel fashion for establishing said boundary limits of said second amplifier.

8. The control system of claim 7 wherein each threshold detector means includes an inverter having an input electrically connected to an output of a respective second amplifier, further includes a third amplifier having an input electrically connected to an output of a respective inverter and an output electrically connected to an input of a respective detecting means, and further includes a fourth amplifier having an input electrically connected to an output of said respective second amplifier and an output electrically connected to an input of said respective detecting means.

9. The control system of claim 8 wherein each inverter includes a third resistor electrically connected in a respective feedback line of said inverter and a fourth resistor having an input side electrically connected to an output of a respective second amplifier and an output side electrically connected to an input of said inverter.

10. The control system of claim 9 wherein each third amplifier includes a third zener diode and a first capacitor each being electrically connected to each other in parallel in a negative feedback line of said respective third amplifier, and each fourth amplifier includes a fourth zener diode and a second capacitor each being electrically connected to each other in parallel in a negative feedback line of said respective fourth amplifier.

11. The control system of claim 10 wherein each threshold detector means includes a plurality of pairs of potentiometers each of which is electrically connected to a positive dc voltage for reference, and further includes a plurality of summing resistors including a first summing resistor having an output side electrically connected to an input of a respective fourth amplifier and an input side electrically connected to a respective first potentiometer of a respective pair of potentiometers; a second summing resistor having an input side electrically connected to an output of a respective second amplifier and an output side electrically connected to a respective fourth amplifier, a third summing resistor having an output side electrically connected to an input of a respective third amplifier and an input side electrically connected to a respective second potentiometer of a respective pair of potentiometers, and a fourth summing resistor having an input side electrically connected to an output of a respective inverter and an output side electrically connected to an input of a respective third amplifier.

12. The control system of claim 11 wherein each third amplifier includes a pair of fifth resistors one of which is electrically connected in a positive feedback line of a respective third amplifier and the other of which has one side electrically connected to a positive input of a respective third amplifier and another side electrically connected to ground, and wherein each fourth amplifier includes a pair of sixth resistors one of which is electrically connected in a positive feedback line of a respective fourth amplifier and the other of which has one side electrically connected to a positive input of a respective fourth amplifier and another side electrically connected to ground.

13. The control system of claim 12 wherein said first switch means includes two or more transistor switches the base of each of which is electrically connected to a respective detecting means through a respective fifth resistor, the emitter of which is electrically connected to a respective base, through a sixth resistor, and to ground, and the collector of which is electrically connected to a respective first relay which has normally open contacts and is electrically connected to a positive dc voltage.

14. The control system of claim 13 wherein said two or more detecting means includes at least a first OR gate, a second OR gate and a third OR gate, and wherein said first switch means includes at least a first AND gate a second AND gate, a third AND gate, and a fourth OR gate,.said first, second and third AND gates each having a output electrically connected to a respective input of said fourth OR gate, and said first and second AND gate each having a first input electrically connected to each other and to an output of said first OR gate, said second and third AND gates each having a second input electrically connected to each other and to an output o said third OR gate and said first AND gate having a second input electrically connected to a first input of said third AND gate and to an output of said second OR gate.

15. The control system of claim 14 wherein said first switch means includes a transistor switch the base of which is electrically connected to an output of said fourth OR gate through a seventh resistor, the emitter of which is electrically connected to said base through an eighth resistor, and to ground, and the collector of which is electrically connected to a second relay which has normally open contacts and is electrically connected to a positive dc voltage.

16. The control system of claim 15 wherein said second switch means includes a fifth OR gate having a first input electrically connected to an output of said first OR gate a second input electrically connected to an output of said second OR gate, and a third input electrically connected to an output of said third OR gate, and further includes a transistor switch the base of which is electrically connected to an output of said fifth OR gate through a ninth resistor, the emitter of which is electrically connected to said bas through a tenth resistor, and to ground, and the collector of which is electrically connected to a third relay which has normally open contacts and is electrically connected to a positive dc voltage.

17. The control system of claim 16 wherein said two or more summing resistor means includes a plurality of pairs of summing resistors, each pair including a fifth summing resistor having an input side electrically connected to a respective second amplifier, and a sixth summing resistor having an input side electrically connected to an output side of said fifth summing resistor and an output side electrically connected to said averaging amplifier means, and further including a respective fourth relay having an input side electrically connected between said fifth and sixth resistor and an output side electrically connected to ground, the combined value each pair of summing resistors having a value of R.

18. The control system of claim 17 wherein said averaging amplifier means includes an averaging amplifier having an input electrically connected to an output of each of said sixth summing resistors, and an output electrically connectable to said apparatus, further includes seventh, eighth and ninth resistors electrically connected in series in a feedback line of said averaging amplifier and further includes a fifth relay having an input electrically connected between said seventh and eighth resistor and an output electrically connected between said eighth and ninth resistor and a sixth relay electrically connected between said eighth and ninth resistor and said output of said averaging amplifier, said seventh resistor having a value of R/3, said eighth resistor having a value of R/6 and said ninth resistor having a value of R/2.

19. The control system of claim 18 wherein each transducer is a temperature measuring transducer.

20. The control system of claim 2 wherein each measuring means is a temperature measuring transducer.

* * * * *